J. ILIFF.
WORK CAR.
APPLICATION FILED JAN. 8, 1909.
929,440.
Patented July 27, 1909.
2 SHEETS—SHEET 2.
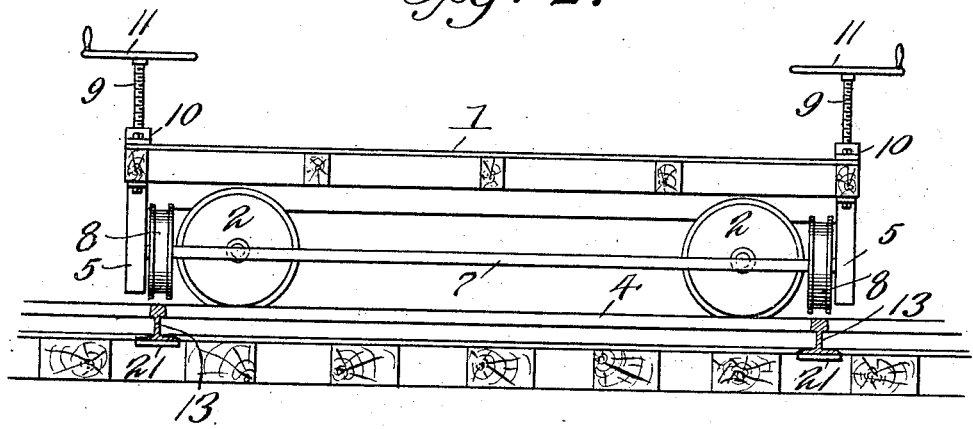
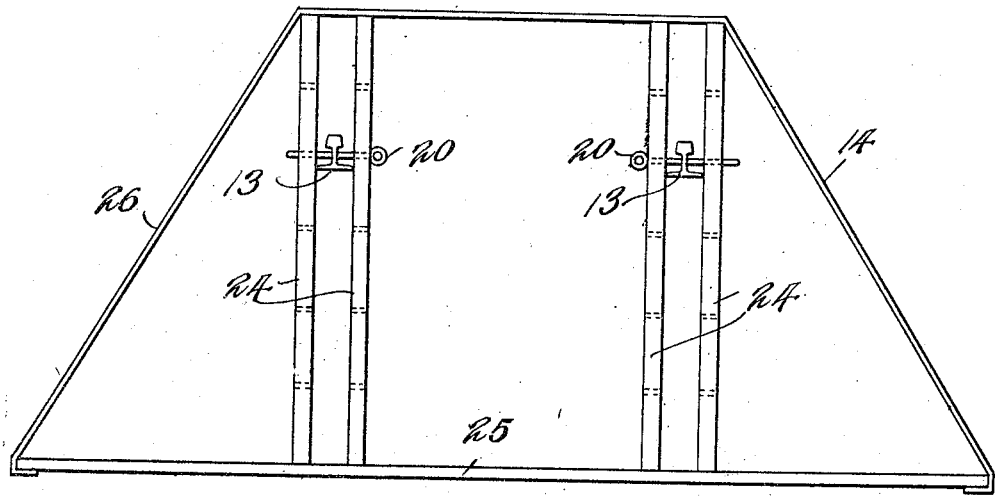
Witnesses
Frank B. Hoffman.
Inventor
John Iliff
By Victor J. Evans
Attorney

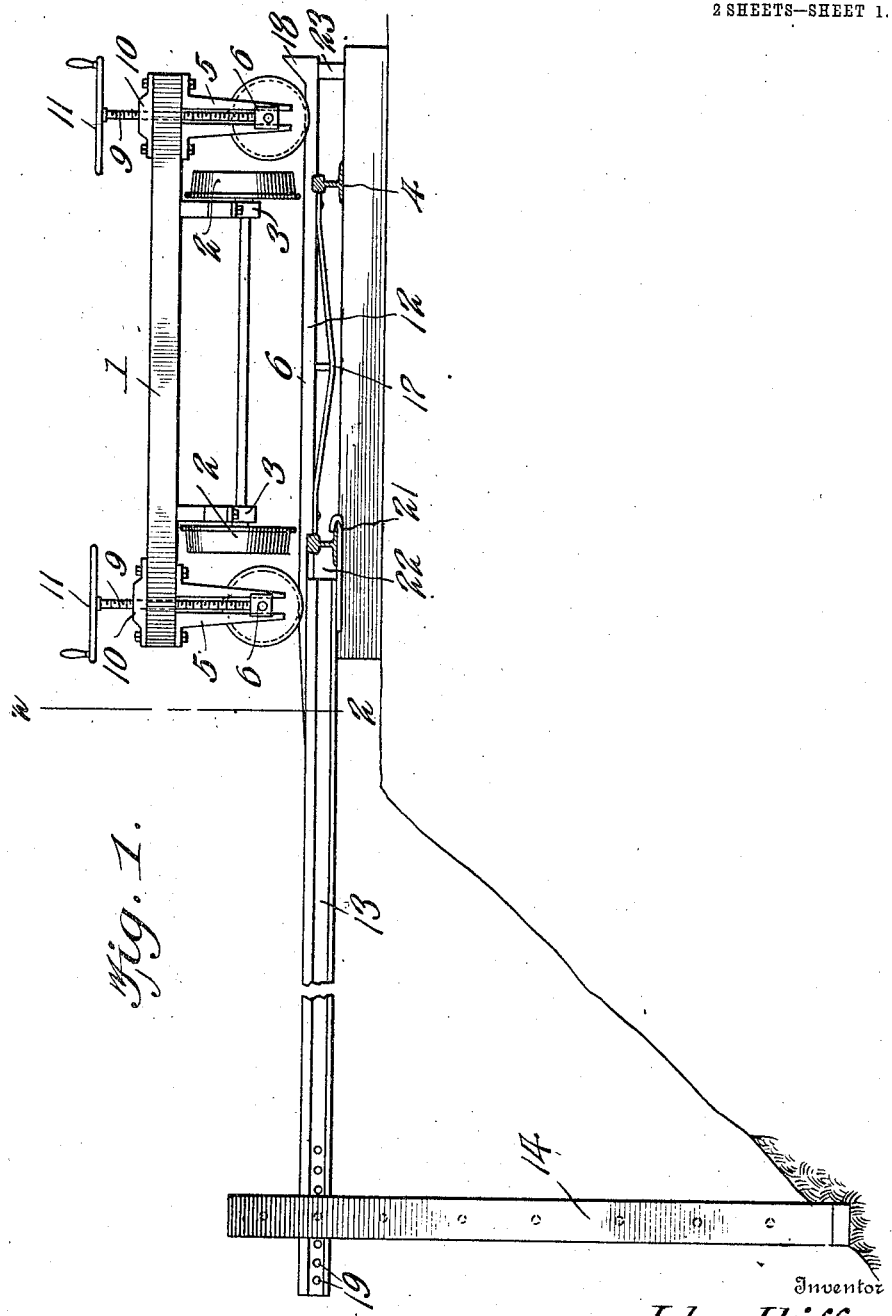

UNITED STATES PATENT OFFICE.

JOHN ILIFF, OF MADISON, WISCONSIN.

WORK-CAR.

No. 929,440.  Specification of Letters Patent.  Patented July 27, 1909.

Application filed January 8, 1909. Serial No. 471,359.

*To all whom it may concern:*

Be it known that I, JOHN ILIFF, a citizen of the United States, residing at Madison, in the county of Dane and State of Wisconsin, have invented new and useful Improvements in Work-Cars, of which the following is a specification.

This invention relates to cars and shipping attachments therefor and the object of the invention is to provide a work car or a rubble car in use on sections with attachments and appliances whereby the car may be readily removed from the main line for the passage of trains without the necessity of running to a side track or the unloading of such cars in order to be able to get them off the track for passing trains.

Another object of the invention is to provide a car and attachment therefor whereby the car may be run off the main track to deposit dirt along embankments adjacent the tracks when the same is needed to widen or otherwise strengthen the dumps.

With the above, and other objects in view which will appear as the description progresses, the invention resides in the novel construction and arrangement of elements hereinafter fully described and claimed.

In the accompanying drawings, there has been illustrated a simple and preferred embodiment of the invention and in which, Figure 1 is a transverse sectional view through a main track showing the method of running a car constructed in accordance with my invention from the main track to allow for the passage of trains. Fig. 2 is a sectional view of the line 2—2 of Fig. 1 and looking in the direction of the arrows. Fig. 3 is a front elevation of the dump jack.

In the accompanying drawings the numeral 1 designates the body of an ordinary hand car which is provided with the usual axles 2 mounted upon suitable bearings 3 and adapted to support the car upon the main rails 4 of the track. The car 1 is provided at its ends at a suitable distance away from the wheels 2 with depending spaced guide members 5. These members 5 have their upper extremities offset and provided with suitable openings adapted for the reception of securing elements whereby the guides are effectively retained upon the body of the car 1.

Mounted for vertical movement between each pair of guides 5 are suitable boxings 6 adapted for the reception of longitudinally extending axles 7. These axles 7 are positioned adjacent both of the longitudinal sides of the car 1 and are each provided with a pair of wheels 8.

Secured to and revolubly mounted in the boxings 6 are threaded rods 9 working in suitable bearings 10 provided upon the top surface of the car body and having their upper extremities provided with suitable hand wheels 11 whereby the wheels 8 carried by the axle 7 may be raised or lowered as desired.

The car 1 is adapted to carry, as accessories, track skids 12, skid rails 13 and a dump jack 14.

The track skid 12 comprises a track member proper 16 having a suitable truss 17. One end of the track 16 is raised as at 18 so as to provide an abutment to prevent the car leaving the track in the wrong direction. The opposite end of the track 16 is beveled downwardly for a purpose now to be described.

The skid rail 13 is of the ordinary construction except that it has the outer extremity of its web provided with a plurality of openings 19 which are adapted for the reception of suitable pintles 20 whereby the same is attached to the rail jack 14. The opposite end of the skid rail 13 is provided with a forwardly extending offset member 21 which is adapted to engage the inner flange of the rail 4, as clearly illustrated in Fig. 1 of the drawings. The space between the rail 4 and the skid rail 13 is adapted for the reception of a suitable wedge 22, constructed of wood or the like and whereby the skid rail is effectively retained upon the main rail. The skid rail 13 has the inner portion of its head adapted to receive the projecting horizontal under face of the inclined extension of the truck skid 12. The truck skid 12 has its under face, beyond its engagement with the inner rail 4, cut away horizontally so that the skid rail and the main rail may be of the same height thereby providing means whereby the skid rail 13 may be formed of a section of ordinary railway rails. The truck skid 12 may also have its under face cut away to provide a pocket for the reception of the head of the opposite rail 4, and the skid is adapted to have its outer end supported by a suitable block 23 interposed between the under face of the rail 16 and the ties of the rails 4.

The dump jack 14 comprises essentially a pair of spaced vertical members 24. These members 24 are supported upon a suitable base 25 and are effectively braced through the medium of a strap 26 secured to the outer ends of the base 25 and engaging the tops of the members 24. These members 24 are each provided with a plurality of horizontally disposed alining openings which are adapted for the reception of the pins 20 and which engage the openings 19 in the web of the skid rail 13. It is to be understood that the spaces between each pair of the members 24 are equal to the width of the base flanges of the rails 13 and that the space between the rails 13 at their point of engagement with the members 24 of the jack is equal to the distance between the wheels 8. The wheels 8 are preferably flanged upon both of their edges as clearly illustrated in Fig. 2 of the drawings and by this means accidental tilting of the truck 1 is greatly lessened if not entirely obviated.

From the above description taken in connection with the accompanying drawings, it will be noted that I have provided an extremely simple and effective car and accessories therefor whereby the car may be readily removed from the main track to allow the passage of trains upon the track, one which effectively provides for the different depths of embankments adjacent the track and one wherein the car may be returned to the main track and the accessories removed and positioned upon the car truck with ease and expediency.

While I have illustrated and described the preferred embodiment of the invention as it now appears to me, it is to be understood that minor details may be resorted to when made within the scope of the following claims, and it is to be understood that while I have described the improvement in connection with a work car I do not limit myself to its application upon this particular form of car as it is equally applicable in connection with various other cars or to engines if desired.

Having thus fully described the invention what is claimed as new is:

1. In a device for the purpose set forth, the combination with a car having main wheels and auxiliary wheels arranged at right angles to the main wheels and being provided with means for moving the auxiliary wheels above or below the tread of the main wheels, of a truck skid adapted to be positioned across the track of the main wheels and beneath the auxiliary wheels, a skid rail coacting with the truck skid, and a rail jack adapted to support the skid rail.

2. In a device for the purpose set forth, the combination with a car having main wheels, and auxiliary wheels arranged at right angles to the main wheels and being provided with means for moving the auxiliary wheels above or below the tread of the main wheels, of a truck skid adapted to be positioned beneath the auxiliary wheels when the main wheels are raised above the track, an offset stop upon one end of the truck skid, said skid being provided with cut away portions adapted to engage the heads of the main rails, a truss brace for the skid beneath the rails, a skid rail coacting with the truck skid, said skid rail being provided with a forwardly projecting finger adapted to engage the base flange of one of the rails, a wedge between the skid rail and the main rail, the web of the skid rail being provided with a plurality of spaced openings and a jack comprising a pair of spaced vertical members having alining openings, and a pin adapted for engagement with these openings and the openings of the skid rail.

In testimony whereof I affix my signature in presence of two witnesses.

JOHN ILIFF.

Witnesses:
R. S. SCHEIBEL,
E. E. HEATH.